United States Patent [19]

Jaeger et al.

[11] 4,430,462
[45] Feb. 7, 1984

[54] CATHODICALLY DEPOSITABLE AQUEOUS ELECTRO-DIP LACQUER COATING COMPOSITION

[75] Inventors: Kurt E. Jaeger; Klausjörg Klein; Hans-Peter Patzschke; Dietrich Saatweber, all of Wuppertal, Fed. Rep. of Germany

[73] Assignee: Herberts GmbH, Wuppertal, Fed. Rep. of Germany

[21] Appl. No.: 384,059

[22] Filed: Jun. 1, 1982

[30] Foreign Application Priority Data

Jun. 6, 1981 [DE] Fed. Rep. of Germany ....... 3122641

[51] Int. Cl.³ .................. C09D 3/58; C09D 5/40; C25D 13/06
[52] U.S. Cl. .................. 523/402; 204/181 C; 523/403; 524/901
[58] Field of Search ........... 204/181 C; 523/402, 523/403; 524/901

[56] References Cited

U.S. PATENT DOCUMENTS

| | | | |
|---|---|---|---|
| 3,367,991 | 2/1968 | Hicks | 525/510 |
| 4,064,090 | 12/1977 | Gibson et al. | 524/901 |
| 4,071,428 | 1/1978 | Bosso et al. | 204/181 C |
| 4,172,822 | 10/1979 | Patzschke | 524/539 |
| 4,220,568 | 9/1980 | Patzschke | 528/295.3 |
| 4,252,703 | 2/1981 | Patzschke et al. | 204/181 C |
| 4,307,153 | 12/1981 | Bernelin et al. | 525/438 |
| 4,370,452 | 1/1983 | Heater | 525/438 |

FOREIGN PATENT DOCUMENTS

| | | |
|---|---|---|
| 12463 | 6/1980 | European Pat. Off. |
| 2426996 | 12/1974 | Fed. Rep. of Germany |
| 1461823 | 1/1977 | United Kingdom |

Primary Examiner—Ronald W. Griffin
Attorney, Agent, or Firm—Mandeville and Schweitzer

[57] ABSTRACT

The invention relates to a cathodically depositable aqueous electro-dip lacquer coating composition containing as synthetic resin binder (A) from 50 to 99% by weight, based on the total quantity of synthetic resin binder, of one or more amino-1,2-epoxy resins, the amino-1,2-epoxy resin or—where several amino-1,2-epoxy resins are present—the mixture of amino-1,2-epoxy resins (a) having an average molecular weight ($\overline{M}n$) of from 700 to 10,000, (b) containing per 1000 molecular weight units from 0.2 to 3.6 lateral or terminal ethylenic double bonds corresponding to a hydrogenation iodine number of from 5 to 90, (c) containing primary and/or secondary alcoholic hydroxyl groups corresponding to a hydroxyl number of from 30 to 450 and (d) having an amine number of from 30 to 150, (B) from 1 to 50% by weight of a substantially non-acid polyester of a polycarboxylic acid containing at least two terminal or lateral, saturated and/or unsaturated β-hydroxy ester groups per molecule and having an average molecular weight of from about 1500 to 10,000, and (C) soluble and/or insoluble transesterification catalysts for the thermal crosslinking of (A) and (B) at temperatures above 140° C.

The invention also relates to the use of the coating composition for cathodic deposition from a lacquer bath onto electrically conductive surfaces.

8 Claims, No Drawings

CATHODICALLY DEPOSITABLE AQUEOUS ELECTRO-DIP LACQUER COATING COMPOSITION

This invention relates to a cathodically depositable aqueous electro-dip lacquer coating composition.

The use of neutralization synthetic resins which can be diluted with water is of considerable significance in the lacquer field because low solvent contents assist the efforts being made to control pollution and also reduce the danger of fire and explosion. A rational, automatic process is made possible by electrophoretic deposition of the binders at the cathode and stoving of the film thus deposited. Solubility in water is obtained by the introduction of amino groups into the resin and by salt formation with acids. In contrast to anodically depositable resins, cathodically depositable resins of the type in question give off hydrogen at the cathode without any adverse effect upon the resin. In addition, at a substantially neutral pH-value, metal ions are only slightly dissolved at the beginning of the electrical coating process, thus avoiding discolouration or spot formation by iron ions.

DE-OS Nos. 27 07 405 and 27 07 482 describe self-crosslinking binders for cathodically depositable electro-dip lacquers in the form of amino-group-containing reaction products of unsaturated copolymers and/or polycondensates and/or polyaddition products containing from 0.5 to 3 lateral or terminal double bonds per 1000 molecular weight units. According to DE-AS No. 27 32 902, reaction products of this type may be used together with urethane compounds as binder systems for cathodic deposition. Disadvantages of these binders include their relatively high organic solvent content emanating from production, the formation of surface faults (craters, roughness) in the coatings, the inadequate elasticity of the coatings and problems of adhesion to other coatings applied thereto.

EP-OS No. 12 463 and EP-OS No. 40 867 describe binder systems consisting of resins containing amino and hydroxyl groups, but essentially no ethylenic unsaturations, combined with saturated non-acid polyesters containing more than one β-hydroxyl ester group per molecule as crosslinking agent, and of hardening catalysts. Coatings incorporating binder systems of this type on non-bonderized or grease-coated steel perform unsatisfactorily in the salt-spray test. In addition, high stoving losses are encountered because the β-hydroxyl ester groups are split off on heating and escape from the lacquer film.

EP-OS No. 4090 and EP-OS No. 25 554 describe binder systems of which the primary and/or secondary amino groups undergo transamination with crosslinking agents containing esterified terminal carboxyl groups. Their disadvantage lies in the fact that the crosslinking reaction requires more reactive amino groups than are consumed for obtaining solubility in water, resulting in less effective protection against corrosion or non-bonderized sheet iron.

The object of the present invention is to obviate most of the known disadvantages. It has been surprisingly found that this is possible by using coating compositions containing the binders defined hereinafter.

Accordingly, the present invention relates to a cathodically depositable aqueous electro-dip lacquer coating composition which contains a synthetic resin binder containing amino groups that can be made soluble in water by protonation with acids, and which optionally contains pigments, fillers, corrosion inhibitors, lacquer auxiliaries, catalysts and—in a quantity of up to 20% by weight, based on the total weight of the coating composition—organic solvents, characterised in that it contains as synthetic resin binder (A) from 50 to 99% by weight, based on the total quantity of synthetic resin binder, of one or more amino-1,2-epoxy resins, the amino-1,2-epoxy resin or-where several amino-1,2-epoxy resins are present-the mixture of amino-1,2-epoxy resins
  (a) having an average molecular weight ($\overline{Mn}$) of from 700 to 10,000,
  (b) containing per 1000 molecular weight units from 0.2 to 3.6 lateral or terminal ethylenic double bonds corresponding to a hydrogenation iodine number of from 5 to 90,
  (c) containing primary and/or secondary alcoholic hydroxyl groups corresponding to a hydroxyl number of from 30 to 450 and
  (d) having an amine number of from 30 to 150,
(B) from 1 to 50% by weight of an essentially non-acid polyester of a polycarboxylic acid containing at least two terminal or lateral, saturated and/or unsaturated β-hydroxy ester groups per molecule and having an average molecular weight of from about 1500 to 10,000, and
(C) soluble and/or insoluble transesterification catalysts for the thermal crosslinking of (A) and (B) at temperatures above 140° C.

The unsaturated hydroxyl-containing amino-1,2-epoxy resin (component A) is obtained by reacting 1,2-di- or polyepoxides with unsaturated carboxylic acids and unsaturated and saturated amines and/or aminoalcohols. It preferably has an average molecular weight of from 1500 to 5000. Viscosities of from about 0.5 to 0.6 Pa s after dilution with ethylene glycol monoethers to 50% by weight at 25° C. correspond to these molecular weights. The suitable average molecular weight and the suitable viscosity may also be obtained by mixing resins of relatively high and relatively low viscosity and molecular weight.

The binder of component (A) contains at least one amino group per molecule. The lower limit to the amine number should preferably be 50 and, more preferably, 70 whilst the upper limit should preferably be at 120 and, more preferably, at 100. If the amine number is too low, the solubility is too low or excessively acid pH-values are established in the deposition baths on account of an excessive degree of neutralization. If the amine number is too high, a weakly adhering film or a blistered surface is formed during deposition. The binders of component (A) may be those which contain substantially no carboxyl groups.

Amine epoxy resins containing hydroxyl groups are best obtained from polyglycidyl ethers containing at least two 1,2-epoxy groups per molecule. They may be obtained (a) by introducing glycidyl groups in alkaline medium, for example through epichlorohydrin,
  (aa) into aliphatic, cycloaliphatic or aromatic OH-functional resins, for example epoxy novolaks, to form polyglycidyl ethers,
  (ab) into aliphatic, cycloaliphatic or aromatic COOH-functional resins to form polyglycidyl esters or
  (ac) into aliphatic, cycloaliphatic or aromatic NH$_2$-functional resins to form polyglycidyl amines, (b) by incorporating unsaturated glycidyl monomers, such as glycidyl (meth)acrylate, N-glycidyl (meth)acrylamide or allyl glycidyl ether by polymerisation into acrylic copolymers.

So far as alternative (a) is concerned, the resins containing 1,2-epoxide groups are with particular preference polyglycidyl ethers corresponding to the following general formula

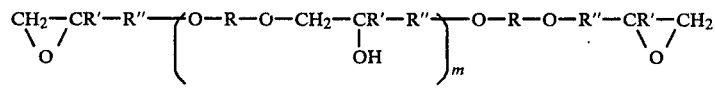

in which

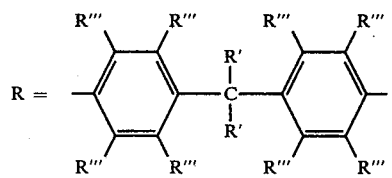

$R'$ = hydrogen or $-C_nH_{2n+1}$,
$R''$ = $-(CR'_2)_n-$,
$R'''$ = $R'$ or halogen, preferably hydrogen,
$m$ = 0 to 6,
$n$ = 1 to 3.

They have an average molecular weight ($\overline{Mn}$) of from about 300 to 2000 and an epoxide equivalent weight of from about 170 to 1500. Resins of this type are reaction products of epichlorohydrin with dihydroxy diphenyl methane (bisphenol F) or dihydroxy diphenyl propane (bisphenol A). Polyepoxides having a suitable molecular weight are produced either by suitably selecting the reaction conditions for the reaction of the bisphenol with epichlorohydrin or by reacting the monomeric diglycidyl compound with more bisphenol or with long-chain polyalcohols, such as 1,6-hexane diol, polytetrahydrofuran diol, polycaprolactone diol, polycaprolactam diol or polybutadiene diol, in the presence of suitable basic or acid catalysts, such as boron fluoride complexes. It is also possible to use corresponding heterocyclic polyepoxy compounds, such as 1,3-diglycidyl-5,5-dimethyl hydantoin, triglycidyl isocyanurate or diepoxides or bisimides.

So far as alternative (b) is concerned, the resins containing epoxy groups are preferably glycidyl (meth)acrylate copolymers obtained by copolymerising glycidyl methacrylate with unsaturated monomers. Unsaturated monomers are styrene, vinyl toluene, (meth)acrylic acid esters having various chain lengths, the methacrylic acid esters preferably containing linear or branched $C_1$-$C_4$-alcohols and acrylic acid esters preferably containing linear or branched $C_2$-$C_8$-alcohols. The amino groups may be introduced either by copolymerization with unsaturated amines, such as dialkyl amino alkyl (meth)acrylates, corresponding acrylamides or N-vinyl imidazole, or by reacting preferably secondary amines or amino alcohols with the epoxy groups.

The amino groups are introduced into component (A) either by the addition of NH-reactive compounds onto the epoxy group or by reacting the hydroxyl groups in the parent resin with basic monoisocyanates of the type formed by reacting aromatic and/or aliphatic and/or cycloaliphatic di- or polyisocyanates with a dialkylamino alkanol (cf. DE-OS No. 27 07 405).

The NH-reactive compounds used are primary monoalkyl amines, such as dialkyl aminoalkyl amine, and/or preferably secondary monoamines, such as dialkylamines, monoalkyl hydroxyalkyl amines or dihydroxy alkyl amines. Examples of suitable compounds of the type in question are diethyl amine, dimethyl aminopropyl amine, N-methyl aminoethanol or diethanolamine. Where primary amines or secondary diamines are used, chain extension occurs, as is the case for example where addition products of 1,6-hexane diamine with 2 moles of glycidyl esters of versatic acid are used. Other suitable secondary diamines, preferably long-chain diamines, are alkyl diaminoalkanes or reaction products of saturated glycidyl ethers with primary diaminoalkanes. The suitable number of hydroxyl groups is formed on the one hand automatically from the epoxy group during the addition of the secondary amino groups, on the other hand it may be controlled through the use of hydroxy alkyl amines.

The molar ratios between the compounds containing epoxy groups and the compounds containing amino groups should be selected in such a way that complete incorporation of the amine is guaranteed because perforation-like surface faults can arise during electrophoretic coating, in other words a slight excess of epoxy groups is an advantage. The reaction of the amines actually begins at room temperature and is generally exothermic. To achieve a complete reaction, it is generally necessary periodically to increase the temperature to about 50° to 120° C. Before addition of the amine, the resin containing 1,2-epoxy groups is dissolved in organic solvents, such as xylene, methyl isobutyl ketone, which have to be subsequently distilled off before dilution, or in such solvents as ethylene glycol monoethyl ether, propylene glycol monoethyl ether, diethylene glycol dimethyl ether or diacetone alcohol which may remain in solution. A thin-layer evaporator or steam distillation may be useful for removing amine residues.

The introduction of the unsaturated double bonds into component (A) is carried out either directly by addition onto the epoxy groups or indirectly by reaction of the hydroxyl group of the parent resin with unsaturated monoisocyanates obtained by reacting aromatic and/or aliphatic and/or cycloaliphatic di- or polyisocyanates with $\alpha,\beta$-unsaturated monocarboxylic acids or corresponding carboxylic acid amides, such as hydroxy alkyl (meth)acrylates, or dicarboxylic acid esters of hydroxy alkyl (meth)acrylates, of the type described in DE-OS No. 27 07 482. The compounds selected mostly give thermally stable urethane groups by virtue of their structure in the molecule. The direct addition onto the epoxy group may be carried out for example with diallyl amine, with unsaturated fatty amines or even with unsaturated fatty acids.

The chain-extending agents used may be unsaturated dicarboxylic acids, such as fumaric acid, or dimerised fatty acids or even adducts of unsaturated monoepoxy compounds with di- or polyamines containing at least two primary amino groups or at least one primary and one secondary amino group, such as 1,6-hexane diamine, 3-aminomethyl aminopropyl amine, diethylene triamine, trimethyl hexamethylene diamine and isophorone diamine, corresponding to the following formula

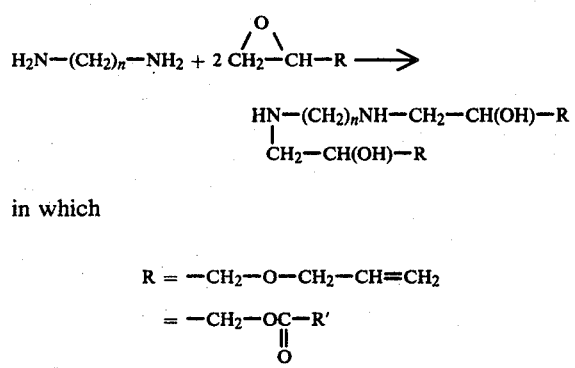

in which $$R = -CH_2-O-CH_2-CH=CH_2$$
$$= -CH_2-\underset{\underset{O}{\|}}{O}C-R'$$

R'=an unsaturated hydrocarbon radical of fatty acids. The unsaturated monoepoxy compounds used may be:
(a) glycidyl esters of linear or branched $C_3$-$C_{18}$-monocarboxylic acids having isolated or conjugated unsaturations,
(b) glycidyl ethers of linear or branched $C_3$-$C_{18}$-monoalcohols having isolated or conjugated unsaturations.

The amino groups of the polyamines are reacted substantially stoichiometrically with such a quantity of unsaturated monoepoxide compounds at temperatures of from about 50° to 105° C. that a molecule containing two reactive secondary amino groups is formed, reacting as chain extender with more polyepoxide. Examples are the reaction products of 1 mole of glycidyl allyl ether with aminoethyl ethanolamine or of 2 moles of linoleyl glycidyl ester with ethylene diamine. Where three reactive sites are used, branchings are incorporated. Chain extension may also be carried out by the incorporation of unsaturatedly substituted primary amines, such as primary allyl amine.

Another production method is transetherification with an etherified methylolated (meth)acrylamide, for example methylol acrylamide monobutyl ether, as described in DE-OS No. 29 34 467. Unsaturated double bonds may also be introduced in the same way by reaction with unsaturated formaldehyde condensation resins, such as phenoplasts or aminoplasts. Suitable phenolic resins are, for example, reaction products of mononuclear and/or polynuclear, optionally alkyl-substituted phenols with formaldehyde or formaldehyde donors, such as paraformaldehyde. The methylol groups may be completely or partly etherified with methanol, ethanol, propanol, butanol and/or unsaturated monoalcohols, such as allyl alcohol, hydroxy alkyl (meth)acrylates or oleyl alcohol. Etherified phenolic resins may also be produced by reaction with unsaturated monoepoxides, such as glycidyl allyl ethers or glycidyl methacrylate. Another modification is possible by reaction with unsaturated monocarboxylic acids, such as (meth)acrylic acid, maleic acid or fumaric acid monoesters, or unsaturated fatty acids such as oleic acid, linoleic acid, linolenic acid or their natural mixtures. Low molecular weight unsaturated phenol ethers, such as the polymethylol compounds of phenol allyl ether (General Electric's Methylon resins) are particularly suitable. Unsaturated aminoplasts may be obtained by reacting the methylolated melamine, benzoguanamine or urea resins with unsaturated monoalcohols or monocarboxylic acids.

The unsaturated amine epoxy resin of component (A) may optionally be modified by the use of corresponding saturated compounds in order to obtain optimal technical properties. However, it is essential to the present invention that both unsaturated double bonds and also hydroxyl groups are present for the different crosslinking reactions. Thus, the lower limit to the hydroxyl number is above 80 and, more particularly, above 120 while the upper limit is below 400 and, more particularly, below 350. The lower limit to the hydrogenation iodine number is above 10 and, more particularly, above 20 while the upper limit is below 75 and, more preferably, below 60. Since the number of hydroxyl groups may be reduced where amino groups and unsaturated compounds are introduced, this effect has to be taken into account in the composition of component (A). In order to obtain suitable optimal properties, it is possible to use a mixture of unsaturated amine-epoxy resin with saturated amine-epoxy resin. Suitable saturated hydroxyl-containing amine-epoxy resins are described in EP-OS No. 12 463. Mixtures of this type are also required to have the molecular weight, hydroxyl number, hydrogenation iodine number and amine number values specified above.

The primary and/or secondary hydroxy groups important to the crosslinking process may be partly replaced by primary and/or secondary amino groups. Resins of this type are produced by stoichiometrically reacting the epoxy groups with ketimines and/or aldimines containing amine groups or even by reaction with excess ethylene diamine and removal of the amine excess by distillation. Production processes of this type are described in more detail in EP-OS No. 25 554. If the number of groups capable of transesterification or transamination is too small, crosslinking after stoving is inadequate and the film becomes too readily soluble in organic solvents. If their number is too high, the film becomes brittle.

The crosslinking agent (component B) required for the reaction or transamination is a polyester containing carboxyl groups or a copolymer containing carboxyl groups of which the carboxyl groups are blocked by optionally substituted 1,2-glycols to form β-hydroxy compounds

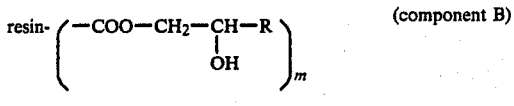
(component B)

in which

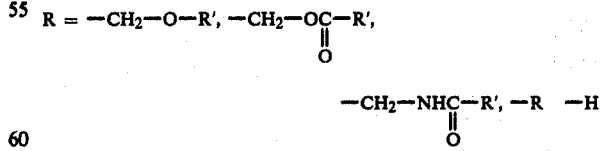

$R' = C_nH_{2n+1}$, $-C_nH_{2n-1}$,
n=1 to 20, preferably 2 to 15 and
m=2 to 15, preferably 3 to 8.

According to the invention, the 1,2-glycols used are substituted by saturated or unsaturated alkyl, ether, ester or amide groups. In the event of thermal crosslinking, the β-hydroxy ester undergoes transesterification with the hydroxyl and/or primary and/or secondary amino groups of component (A) in the presence of catalysts, the reaction being accompanied by elimination of the optionally substituted glycol. The crosslinking agent preferably contains 2 to 15 β-hydroxy ester groups per molecule and has an average molecular weight of from 2000 to 6000. A number of from 3 to 8 β-hydroxy ester groups per molecule is particularly preferred. Examples of crosslinking agents such as these are poly-(2-hydroxyalkyl)-esters of aliphatic, alicyclic or aromatic polycarboxylic acids containing at least two carboxyl groups, for example polyethylene glycol terephthalate.

According to EP-OS No. 12 463, it is possible to produce polycondensates from trimellitic acid anhydride and the glycidyl ester of versatic acid in a molar ratio of from about 1:1.8 to 1:2.1.

Where unsaturated β-hydroxy esters are used, the thermal cleavage products are incorporated in the film through activation of the double bonds. In this way, the loss of film during stoving is considerably reduced. To form an unsaturated crosslinking agent, polycondensation is preferably carried out in stages:

first by the reaction of trimellitic acid anhydride with saturated glycidyl compounds or polyalcohols, trimellitic acid being used in excess, then by reaction of the non-esterified carboxyl groups with an additional quantity of unsaturated glycidyl compounds or monoepoxy alkenes, such as epoxy butene, which is taken to be equivalent on the basis of the acid number.

Ethylenic double bonds corresponding to a hydrogenation iodine number of from 5 to 80 and preferably from 10 to 50 are preferably present.

The second stage of the reaction is optionally carried out in the presence of suitable catalysts, such as tertiary amines, triphenyl phosphine, chromium complexes or other Friedel-Crafts catalysts. This process makes it possible to use another hydrolysis-stable polycondensate containing carboxyl groups in the first stage. A carboxyl-containing acrylic copolymer which may be obtained by polymerizing (meth)acrylic acid, styrene and (meth)acrylic acid esters differing in their chain length is also suitable for this purpose. A particularly suitable polycondensate is a carboxyl-containing parent resin or trimellitic acid anhydride and/or isophthalic acid and/or terephthalic acid dimethyl ester condensed with ethylene glycol, neopentyl glycol and/or other polyols, such as trimethylol propane, pentaerythritol, which is subsequently converted into the substantially neutral β-hydroxy ester. Through the incorporation of tertiary aminoalcohols, such as triethanolamine or methyl diethanolamine, or even diaminoalkyl amines, such as dimethyl aminopropyl amine, it is also possible to introduce into component (B) basic functions which improve solubility. The crosslinking agent may optionally contain a residual acid number, although it should not be so high that the resin is no longer entrained to the cathode on account of its solubility.

The ratio in which components (A) and (B) are mixed may vary within wide limits in the coating composition. It is preferably between 80:20 and 60:40 and is empirically determined from the optimal performance properties attainable at a given stoving temperature. Even a few percent of component (B) added to component (A) can significantly reduce its suceptibility towards crater formation. The components may be cold-mixed or may even be precondensed at elevated temperature, as known from the prior art (as represented for example by EP-OS No. 12 463). In this case, components (A) and (B) react with one another to a certain extent without the mixture losing its thermosetting properties or its ability to be made soluble in water by protonation with acids.

Metal oxides, metal salts or metal complexes of monovalent or polyvalent metals are used as the transesterification catalysts, component (C), in a quantity of from 0.1 to 10% by weight and preferably in a quantity of from 2 to 6% by weight (of components (A) and (B)). They are generally dissolved in aliphatic and aromatic hydrocarbons after salt formation with 2-ethyl hexanoic acid or naphthenic acid and the resulting solution emulsified into the electrophoresis bath. Another possibility comprises complexing the metals with acetyl acetonate or dicyclopentadiene. Examples of suitable catalysts are antimony trioxide, cobalt naphthenate, lead octoate, cadmium acetyl acetonate, zinc acetyl acetonate, thallium dicyclopentadiene or triethanolamine titanate. Lead octoate or lead naphthenate are preferably used. The metal catalysts may also be incorporated in finely dispersed form as pigments, such as lead silicate. Water-soluble metal salts are also suitable transesterification catalysts when the metal is deposited in finely divided form with the lacquer either as a compound or as a complex.

The cationic synthetic resin binder is made soluble in water in known manner by protonation with acids. Examples of acids are hydrochloric acid, formic acid, acetic acid, lactic acid, citric acid, malonic acid, acrylic acid, phosphoric acid or alkyl phosphoric acid. The acid has to be added in at least such a quantity that the cationic synthetic resin binder is dissolved. An excess of acid, i.e. a degree of neutralization of more than 100%, is best avoided.

The coating composition may additionally contain standard lacquer additives, such as catalysts, levelling agents, anti-foam agents, etc. It is of course advisable to select those additives which do not enter into any troublesome reactions with water at an acid to neutral pH-value, do not entrain any troublesome foreign ions and do not become unstirrable after prolonged standing, i.e. the coating composition must be able to be converted into a useable dispersion by stirring, even after prolonged standing.

In order to reduce viscosity, to control the deposition voltage and to improve adhesion and levelling, the coating composition may contain up to approximately 20% by weight of organic solvents. As low as an organic solvent content as possible is desirable, amounting to less than 15% by weight and, more preferably, to less than 10% by weight. Suitable solvents include alcohols, glycol ethers, ketone alcohols, optionally containing added aliphatic and aromatic hydrocarbons of different chain lengths. In selecting the solvent, it is important to bear in mind that component (B) in the dispersion is not dissolved and that fractions of water-insoluble solvents can facilitate and stabilize the dispersion process. Coverage deteriorates with increasing solvent content and overcoating can occur. The thickness of the deposited layer decreases with decreasing solvent content.

After dilution with water, the solids content of the coating composition according to the invention best amounts to between 5 and 30% by weight and preferably to between 10 and 20% by weight. The pH-value of the lacquer is generally in the range from about 5.0 to 7.5 and preferably in the range from 5.8 to 6.5. If the pH value is too low, dispersion problems arise and the resin precipitates. If the pH value is too high, intensified electrolysis occurs, adversely affecting the surface. Electrophoretic deposition is best carried out at the earliest 24 hours after preparation of the bath. During this period, the bath is best continuously stirred to achieve uniform distribution. Electrically conductive, non-corroding electrodes, for example of stainless steel or graphite, are used as the anode. The article to be cathodically coated and the anode are dipped into an aqueous bath, which is standard procedure for electrophoretic deposition. It is possible to coat any metallically conductive workpieces, for example copper, aluminium, tin, zinc, iron and alloys of these metals. During the deposition process, the bath is best kept at temperatures in the range from about 15° to 35° C. The solids content, the deposition temperature and time and the voltage are selected in such a way that the required layer thickness is obtained after rinsing with water and stoving.

When an electrical current is applied with a voltage of preferably from 50 to 500 volts between the metallically conductive workpiece and a counter-electrode, the water soluble carrier resin is coagulated at the cathode, taking with it the water-insoluble crosslinking agent, pigments etc. This may produce a shift in the ratio of pigment to synthetic resin binder in the deposited film in favour of the pigment. At the same time, water and the acid used for neutralisation are enriched in the bath. For re-filling, therefore, it is necessary to use concentrated lacquers which counteract these shifts by changing the quantitative ratios. This correction may also be made by using suitable apparatus, for example electrodialysis units.

Determination of the cleavage products is carried out by measuring the weight loss (based on the quantity of film weighed out before preliminary drying) which arises when a coated metal plate predried for 1 hour at 100° C. is additionally stoved for 25 minutes at 180° C.

EXAMPLES

Resins used for the Examples (A1) Unsaturated amine epoxy resin

As also described in DE-AS No. 27 32 902, column 9, Example A4, 264 g of diethanolamine are added dropwise over a period of 1 hour at 100° to 110° C. to a solution of 1259 g of an epoxide resin based on bisphenol A (epoxide equivalent weight approximately 500) in 656 g of diethylene glycol dimethyl ether. The reaction mixture is then heated to 150° C. and kept at that temperature for another hour.

821 g of a 70% solution of a monoisocyanate of tolylene diisocyanate and hydroxy ethyl methacrylate (molar ratio 1:1) in ethylene glycol monoethyl ether acetate are then added to the reaction mixture at 60° to 70° C., after which the batch is left to react until the NCO-value is substantially zero.

The binder has the following characteristics:
Solids content: 69.3% by weight (after stoving for 60 minutes at 125° C.)
Amine number: 65 mg of KOH/g of solid resin
Hydroxyl number: 138 mg of KOH/g of solid resin
Hydrogenation iodine No: 22
Epoxide equivalent weight: >10,000

(A2) Unsaturated amine epoxide resin

As also described in DE-AS No. 27 32 902, Example A2, 2262 g of epoxide resin based on bisphenol A (epoxide equivalent weight approximately 260) are dissolved at 60° to 70° C. in 2023 g of diethylene glycol dimethyl ether and, after the addition of 0.8 g of hydroquinone and 2453 g of a semiester of tetrahydrophthalic acid anhydride and hydroxy ethyl methacrylate, the resulting solution is heated to 100°-110° C. The temperature of 100° to 110° C. is maintained until the acid number has fallen below 3 mg of KOH/g. The reaction mixture is then reacted in the same way as for (A1) with 3262 g of a 70% solution of a monoisocyanate of tolylene diisocyanate and dimethyl ethanolamine (molar ratio 1:1) in diethylene glycol dimethyl ether.

(A3) Saturated amine epoxy resin

In accordance with EP 12 463, page 17, Example I(b), 391 g of diethanolamine, 189 g of 3-(N,N-dimethylamino)-propylamine and 1147 g of an adduct of 1,6-diaminohexane and Cardura E 10$^{(R)}$ (molar ratio 1:2) are added to 5274 g of an epoxide resin based on bisphenol A (epoxide equivalent weight approximately 472) in 2999 g of ethylene glycol monobutyl ether. The mixture is then stirred for 4 hours at 85° to 90° C. and then kept for 1 hour at 120° C.

(A4) Amine epoxy resin mixture 1200 g of solution "A2" are mixed by thorough stirring for 15 minutes with 800 g of solution "A3".

The mixture has the following characteristics for a solids content of 70.4% by weight:
Amine number: 72 mg of KOH/g of solid resin
Hydroxyl number: 136 mg of KOH/g of solid resin
Hydrogenation iodine No.: 19
Epoxide equivalent weight: >10,000

(A5) Amine epoxy resin mixture 800 g of solution "A2" and 1200 g of solution "A3" are mixed by thorough stirring for 15 minutes. The mixture has the following characteristics for a solids content of 70.1% by weight:
Amine number: 75 mg of KOH/g of solid resin
Hydroxyl number: 193 mg of KOH/g of solid resin
Hydrogenation iodine No.: 13
Epoxide equivalent weight: >10,000

(A6) Unsaturated amine epoxy resin

Preliminary product D:

528 g of an epoxy resin based on bisphenol A and having an epoxy equivalent weight of 490 are dissolved in 224 g of diethylene glycol dimethyl ether. 38.3 g of diethanolamine are added at 60° C. and the solution is kept at that temperature until 1.33 milliequivalents (epoxide and amine) are titrated per gram of solution. A mixture of 18.6 g of dimethylaminopropyl amine and 11.6 g of an addition product of 1 mole of 1,6-hexane diamine and 2 moles of the glycidyl ester of versatic acid is then added. After the expected exothermic reaction has taken place, the reaction mixture is kept for 1 hour at 90° C. and then for 3 hours at 120° C.

This is followed by dilution with 75 g of diethylene glycol dimethyl ether to a solids content of 70% by weight (after stoving for 40 minutes at 180° C.).
Amine number: 88 mg of KOH/g of resin
Viscosity: 513 mPas (after dilution with diethylene glycol dimethyl ether at 25° C. to a solids content of 50% by weight).

945.5 g of the preliminary product D are mixed with 2 g of lead octoate (72%), 2 g of 4-methyl-2,6-di-tert.-butyl phenol and 54.5 g of methylol acrylamide monobutyl ether and, at a temperature rising from 100° to 130° C., 27.2 g of n-butanol are distilled off, ultimately in a light vacuum.
Solids content: 77.8% by weight (40 minutes at 180° C.)
Iodine number: 12
Amine number: 87 mg of KOH/g of solid resin
Viscosity: 740 mPas (after dilution with diethylene glycol dimethyl ether at 25° C. to a solids content of 50% by weight).

(A7) Unsaturated amine epoxide resin
Preliminary product E:
240 g of hydroxy ethyl acrylate (anhydrous) are introduced dropwise with thorough stirring over a period of about 1 hour at 35° C. in an inert gas atmosphere into a solution of 360 g of tolylene diisocyanate in 400 g of diethylene glycol dimethyl ether (anhydrous), after which the mixture is kept for 2 hours at 60° to 70° C.
NCO-content: 14.5% by weight
Solids content: approximately 60% by weight (40 minutes at 180° C.)

849.3 g of preliminary product D and 150.7 g of preliminary product E were stirred for 6 hours at 80° C. in an inert gas atmosphere.
Solids content: 67.3% by weight (40 minutes at 180° C.)
Hydrogenation iodine No.: 11
Amine number: 88 mg of KOH/g of solid resin
Viscosity: 1190 mPas (after dilution with diethylene glycol dimethyl ether at 25° C. to a solids content of 50% by weight).

(A8) Unsaturated amine epoxy resin mixture
1030 g of the saturated amine epoxy resin A3 were heated to 80° C. after the addition of 170 g of ethylene glycol monoethyl ether, followed by the addition of 800 g of Methylon® resin 57 108 (a product of General Electric). The mixture was then heated to 120° C. and kept at that temperature for 2 hours.
Solids content: 72.0% by weight (after stoving for 40 minutes at 150° C.)
Viscosity: 3.3 Pas (after dilution with ethylene glycol monobutyl ether to a solids content of 60% by weight)
The "precondensate" formed was additionally mixed with 1982 g of amine epoxy resin (A3) and 497 g of ethylene glycol monoethyl ether.

(B1) Saturated crosslinking agent
In accordance with Ep 12 463, page 17, Example II(a), 781 g of trimellitic acid anhydride are dissolved at 100° C. in 1976 g of ethylene glycol monobutyl ether and the resulting solution mixed with 2236 g of Cardura®E 10 and with 7 g of benzyl dimethylamine.
The mixture is heated with stirring to 120° C. and kept at that temperature until its acid number has fallen below 1.1 mg of KOH/g.
The polyester has the following characteristics:
Solids content: 70.7% by weight (60 minutes at 125° C.)
Acid number: 0.7 mg of KOH/g of solid resin
Epoxide equivalent weight: >10,000.

(B2) Unsaturated crosslinking agent
Preliminary product C:
514.2 g of hydroxy pivalic acid neopentyl glycol and 209.2 g of isophthalic acid are esterified to an acid number of 13.5 at a temperature rising to at most 238° C. After cooling to 180° C., 276 g of trimellitic acid anhydride are added. The temperature is then slowly increased to 240° C. and kept at that level until the acid number amounts to 108.
Viscosity: 1000 mPas (after dilution with monobutyl glycol ether at 25° C. to a solids content of 50% by weight)

544 g of preliminary product C are diluted with 300 g of ethylene glycol monobutyl ether, 2 g of 4-methyl-2,6-di-tert.-butyl phenol and 2 g of triphenyl phosphite. After the addition of 156 g of glycidyl methacrylate, the temperature is kept at 80° C. until the acid number is less than 2. If the acid number remains above 2 and no more epoxide can be detected in the solution, a little more glycidyl methacrylate may be added.
Solids content: approximately 70% by weight (40 minutes at 180° C.)
Acid number: 0.6 mg of KOH/g of solid resin
Hydrogenation iodine No: 38
Viscosity: 2900 mPas (after dilution with monobutyl glycol ether at 25° C. to a solids content of 60% by weight).

EXAMPLE 1

50 g of ethylene glycol monobutyl ether are added with stirring to 287 g of binder solution A1 (solids content 69.3% by weight). 106 g of micronized iron oxide red and 22 g of lead silicate are dispersed into the resulting mixture using a high speed dissolver. The product is then ground in a laboratory bead mill, the temperature of the material being ground not being allowed to rise beyond 40° C. The pigment concentrate is completed with 287 g of binder solution A1 and 240 g of polyester B1 (solids content 70.7% by weight).

To prepare a KTL-bath, 50 g of lactic acid (80% in water) and 3458 g of fully deionized water are added with thorough stirring.
Bath data:
Solids content: 14.8% by weight (after stoving for 30 minutes at 180° C.)
pH-value (20° C.): 5.1
MEQ$_S$-value: 56 mval* of acid/100 g of solids
Specific conductivity: 1230 $\mu$S·cm$^{-1}$
*= 1 mval is the quantity of substance which is equivalent to 1 mMole of a reactant known to be monofunctional.

Lacquer films are cathodically deposited from the KTL-bath onto non-phosphatized steel plates, rinsed with water and hardened at elevated temperature (15 minutes at an object temperature of 175° C.).

The coatings having a dry film thickness of from 16 to 18 $\mu$m are cross-cut and subjected to the salt spray test according to DIN 50 021. After 240 hours, 1 to 2 mm deep penetration beneath the cut is observed. The film is free from surface rust and blisters.

EXAMPLE 2

290 g of binder solution "A4" (solids content 70.4% by weight) are mixed with 119 g of crosslinking agent B1 (solids content 70.8% by weight), 50 g of ethylene glycol monobutyl ether and 12 g of lead octoate (72% in white spirit and xylene, lead content 31%). 8 g of carbon black, 80 g of aluminium silicate and 4 g of lead silicate are dispersed into the binder mixture by means of a high-speed dissolver, followed by grinding in a laboratory bead mill.

After another 427 g of binder solution "A4", 20 g of glacial acetic acid and 3940 g of fully deionized water had been stirred in, a KTL-lacquer having the following bath data was obtained:
Solids content: 14.5% by weight (after stoving for 30 minutes at 180° C.)
pH-value (20° C.): 6.4
MEQ$_S$-value: 53 mval of acid/100 g of solids
Specific conductivity (20° C.): 640 $\mu$S·cm$^{-1}$ Lacquer films are deposited from the KTL bath onto non-phosphatized steel plates and treated in the same way as described in Example 1.

In addition, steel plates are immersed for 1 minute in a 5% solution of the mineral oil "Anticorit" (Supplier: Rudolf Fuchs, MineralÖlwerke KG, Duisburg) in 100–140 petrol, subsequently left standing for 10 minutes to air off and then dried for 2 hours at 100° C. in a recirculating air drying cabinet. These oil-treated plates are also coated and treated in the same way as described in Example 1. The salt spray test is then carried out without cutting the dry film.

COMPARISON TEST 1 (EP-OS 12 463)

Quantities of 290 g and 319 g of solution "A3" are used instead of the 290 g and 427 g of binder solution "A4" in Example 2. The proportion of polyester B1 is increased to 227 g commensurate with the higher content of hydroxyl groups in the binder.

The binder of the cathodic electro-dip coating bath is thus substantially free from terminal or lateral double bonds.

The results of the salt spray test according to DIN 50 021 are set out in Table 1.

EXAMPLE 3

20 g of lead octoate (80% in ethylene glycol monobutyl ether) and 50 g of ethylene glycol monobutyl ether are introduced into 290 g of binder solution "A5". 8 g of carbon black and 86 g of aluminium silicate are incorporated by dispersion, followed by grinding, in the same way as in Example 2.

The concentrate is completed by the addition of 247 g of binder solution "A5" and 159 g of polyester B1 (solids content 70.8% by weight) in the same way as described in Example 2. To prepare a cathodically depositable electro-dip lacquer, the product is neutralized with 23 g of formic acid (50% in water) and diluted with 2870 g of fully deionized water.

Bath data:
Solids content: 14.9% by weight (after stoving for 30 minutes at 180° C.)
pH-value (20° C.): 5.7
MEQ$_S$-value: 51.6 mval of acid/g of solids
Specific conductivity (20° C.): 1460 $\mu$S·cm$^{-1}$ Steel plates of the type described in Example 1 and oil-treated steel plates of the type described in Example 2 are similarly coated in the KTL bath and treated. Steel plates treated with Bonder 132 (zinc phosphatizing) are coated and tested in the same way.

The results of the salt spray test are again set out in Table 1.

EXAMPLE 4

187.5 g of the unsaturated amine epoxy resin "A6" are mixed with 77.1 g of the unsaturated crosslinking agent "B2", 14.4 g of lead octoate (72%) and 40 g of monobutyl glycol ether. After the addition of 13.5 g of 80% lactic acid, the product is diluted with 1667 g of deionized water to a solids content of approximately 10% by weight.
MEQ-acid: approximately 60
pH-value: 5.2
Bath conductivity: 1050 $\mu$Scm$^{-1}$ The films were deposited for 2 minutes at a bath temperature of 25° C. onto Bonder 127 plates, rinsed with water and stoved for 25 minutes at 160° C.
Cleavage products: 12.2% by weight
Deposition voltage: 260 volts for a dry film thickness of 17 $\mu$m
Pendulum hardness (DIN 53 157): 134 seconds.

EXAMPLE 5

211.7 g of the unsaturated amine epoxy resin "A7" are mixed with 77.1 g of unsaturated crosslinking agent "B2", 14.4 g of lead octoate (72%) and 40 g of monobutyl glycol ether. After the addition of 13.5 g of lactic acid, the product is diluted with 1683 g of deionized water to a solids content of approximately 10% by weight.
MEQ-acid: approximately 60
pH-value: 4.7
Bath conductivity: 888 $\mu$Scm$^{-1}$ The films were deposited for 2 minutes at a bath temperature of 25° C. onto Bonder 127 plates, rinsed with water and stoved for 25 minutes at 160° C.
Cleavage products: 9.7% by weight
Deposition voltage: 200 volts for a dry film thickness of 17 $\mu$m
Pendulum hardness (DIN 53 157): 213 seconds

COMPARISON TEST 2 (EP-OS No. 12 463)

210.1 g of a saturated amine epoxy resin similar to "A3" (solids content 69.3% by weight) are mixed with 67.9 g of a saturated crosslinking agent similar to "B1" (solids content 79.5% by weight), 14.4 g of lead octoate (72%) and 40 g of ethylene glycol monobutyl ether. After the addition of 13.5 g of 80% lactic acid, the product is diluted with 1654 g of deionized water to a solids content of approximately 10% by weight.
MEQ-acid: approximately 60
pH-value: 5.4
Bath conductivity: 1410 $\mu$Scm$^{-1}$ The films were deposited for 2 minutes at a bath temperature of 25° C. onto Bonder 127 plates, rinsed with water and stoved for 25 minutes at 160° C.
Cleavage products: 21.6% by weight
Deposition voltage: 190 volts for a dry film thickness of 17 $\mu$m
Pendulum hardness (DIN 53 157): 141 seconds

EXAMPLE 6

13 g of carbon black and 111 g of aluminum silicate are ground with 600 g of the unsaturated amine epoxy resin mixture A8 in a laboratory bead mill. After another 243 g of the unsaturated amine epoxy resin mixture A8, 28 g of lead octoate (72% in white spirit and xylene, lead content 31%), 149 g of the crosslinking agent B1 and 29 g of formic acid (5% in water) have been stirred in, the product is diluted while stirring thoroughly with 3827 g of fully deionized water.

Bath data:
Solids content: 15.0% by weight (after stoving for 30 minutes at 180° C.)
pH-value (20° C.): 5.6
MEQ$_S$-value: 52 mvals of acid/100 g of solids
Specific conductivity: 1780 $\mu$S cm$^{-1}$ Lacquer films are cathodically deposited from the KTL-bath onto phosphatized and non-phosphatized steel plates, rinsed with water and hardened at elevated temperature (15 minutes at an object temperature of 175° C.). The lacquer films are hard and elastic and, after the salt spray test, show better results than the lacquer films produced in accordance with Comparison Test 1.

TABLE 1

Mechanical values and results of the salt spray test according to DIN 50 021

| | Mechanical values | | | Salt spray test | | |
|---|---|---|---|---|---|---|
| | Erichsen indentation (mm) | Impact | Substrate | Exposure time (h) | Penetration beneath cut (mm) | Surface |
| Example 2 | 6.1 | 50 IP | Steel plate | 360 | 0.7–0.9 | Free from blisters |
| Comparison test 1 | 6.3 | 50 IP | Steel plate | 360 | 3.5–4.6 | Serious blistering |
| Example 3 | 6.0 | 50 IP | Steel plate | 360 | 0.9–1.3 | Free from blisters |
| Example 2 | see above | see above | Oil-treated steel plate | 240 | n.a. | Free from blisters no surface rust |
| Comparison test 1 | see above | see above | Oil-treated steel plate | 240 | n.a. | Formation of small blisters and some surface rust |
| Example 3 | see above | see above | Oil-treated steel plate | 240 | n.a. | Free from blisters no surface rust |
| Example 3 | see above | see above | Bonder 132 | 504 | 0.8–0.9 | Free from blisters |

We claim:

1. A cathodically depositable aqueous electro-dip lacquer coating composition which contains a synthetic resin binder containing amino groups that can be made soluble in water by protonation with acids, and which optionally contains pigments, fillers, corrosion inhibitors, lacquer auxiliaries, catalysts and-in a quantity of up to 20% by weight, based on the total weight of the coating composition-organic solvents, characterized in that it contains as synthetic resin binder,
(A) from 50 to 99% by weight, based on the total quantity of synthetic resin binder, of one or more amino-1,2-epoxy resins, the amino-1,2-epoxy resins or—where several amino-1,2-epoxy resins are present, the mixture of amino-1,2-epoxy resins
  (a) having an average molecular weight ($\overline{Mn}$) of from 700 to 10,000,
  (b) containing from 0.2 to 3.6 lateral or terminal ethylenic double bonds per 1000 molecular weight units, corresponding to a hydrogenation iodine number of from 5 to 90,
  (c) containing primary and/or secondary alcoholic hydroxyl groups corresponding to a hydroxyl number of from 30 to 450 and
  (d) having an amine number of from 30 to 150,
(B) from 1 to 50% by weight of a substantially non-acid polyester of a polycarboxylic acid which contains at least 2 terminal or lateral, saturated and/or unsaturated β-hydroxy ester groups per molecule and which has an average molecular weight of from about 1500 to 10,000 and
(C) soluble and/or insoluble transesterification catalysts for the thermal crosslinking of (A) and (B) at temperatures above 140° C.

2. A coating composition as claimed in claim 1, characterized in that it contains from 60 to 80% by weight of component (A) and from 40 to 20% by weight of component (B).

3. A coating composition as claimed in claim 1 or 2, characterized in that the amino-1,2-epoxy resin present in component (A) or—where several amino-1,2-epoxy resins are present—the mixture of amino-1,2-epoxy resins has an average molecular weight ($\overline{mn}$) of from 1500 to 5000.

4. A coating composition as claimed in claim 1, characterized in that the amino-1,2-epoxy resin present in component (A) or—where several amino-1,2-epoxy resins are present—the mixture of amino-1,2-epoxy resins has a hydrogenation iodine number of from 10 to 75 and preferably from 20 to 60.

5. A coating composition as claimed in claim 1, characterized in that the amino-1,2-epoxy resin present in component (A) or—where several amino-1,2-epoxy resins are present—the mixture of amino-1,2-epoxy resins has a hydroxyl number of from 80 to 400 and preferably from 120 to 350.

6. A coating composition as claimed in claim 1, characterized in that the amino-1,2-epoxy resin present in component (A) or—where several amino-1,2-epoxy resins are present—the mixture of amino-1,2-epoxy resins has an amine number of from 50 to 120 and preferably from 70 to 100.

7. A coating composition as claimed in claim 1, characterized in that component (B) has a hydrogenation iodine number of from 5 to 80 and preferably from 10 to 50.

8. The use of the coating composition claimed in claim 1 for cathodic deposition from a lacquer bath onto electrically conductive surfaces.

* * * * *